Jan. 10, 1933. C. E. FURGASON 1,893,544
BRAKE AND CLUTCH LEVER
Filed Dec. 9, 1929 2 Sheets-Sheet 1
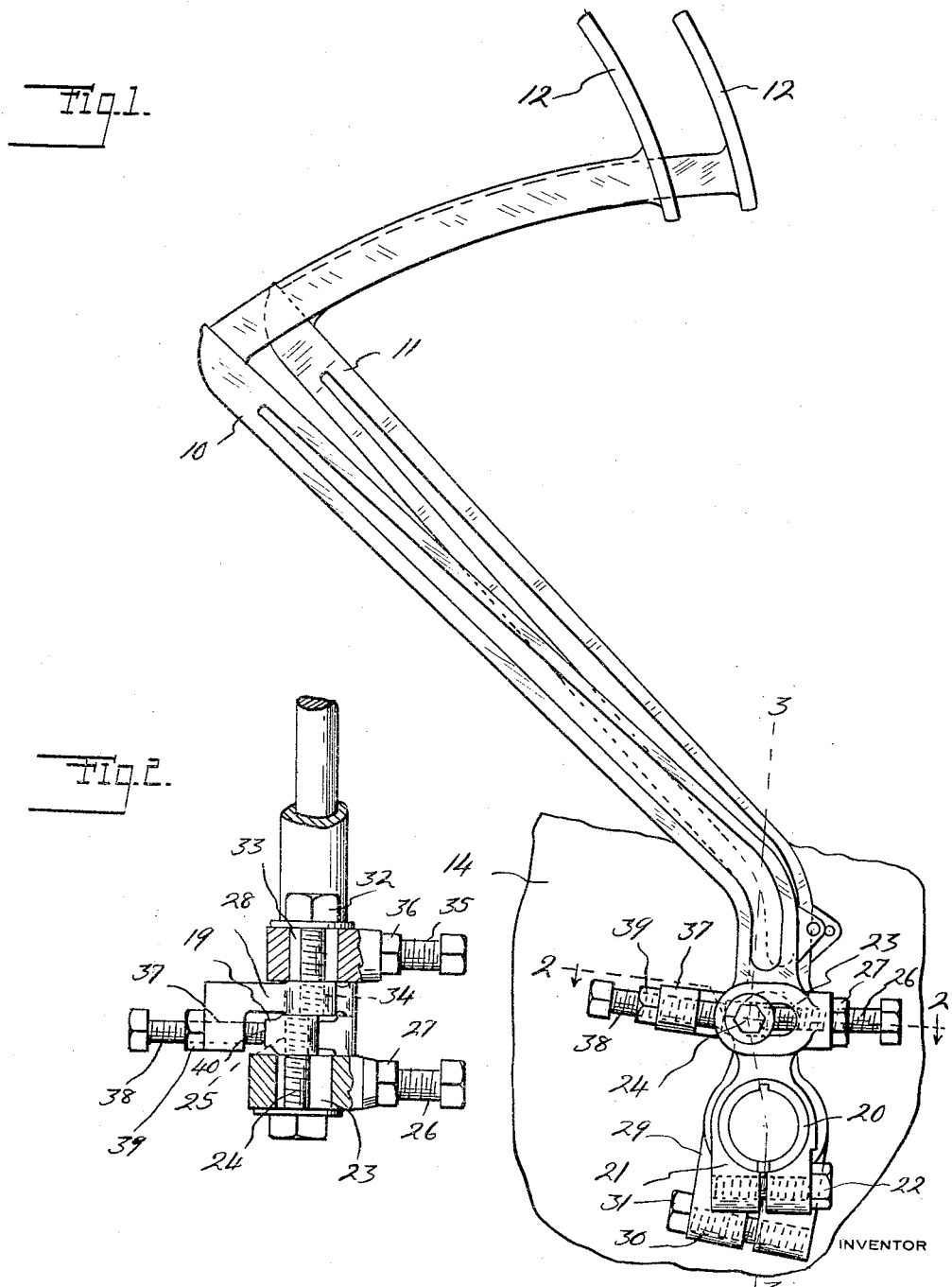
Claude E. Furgason

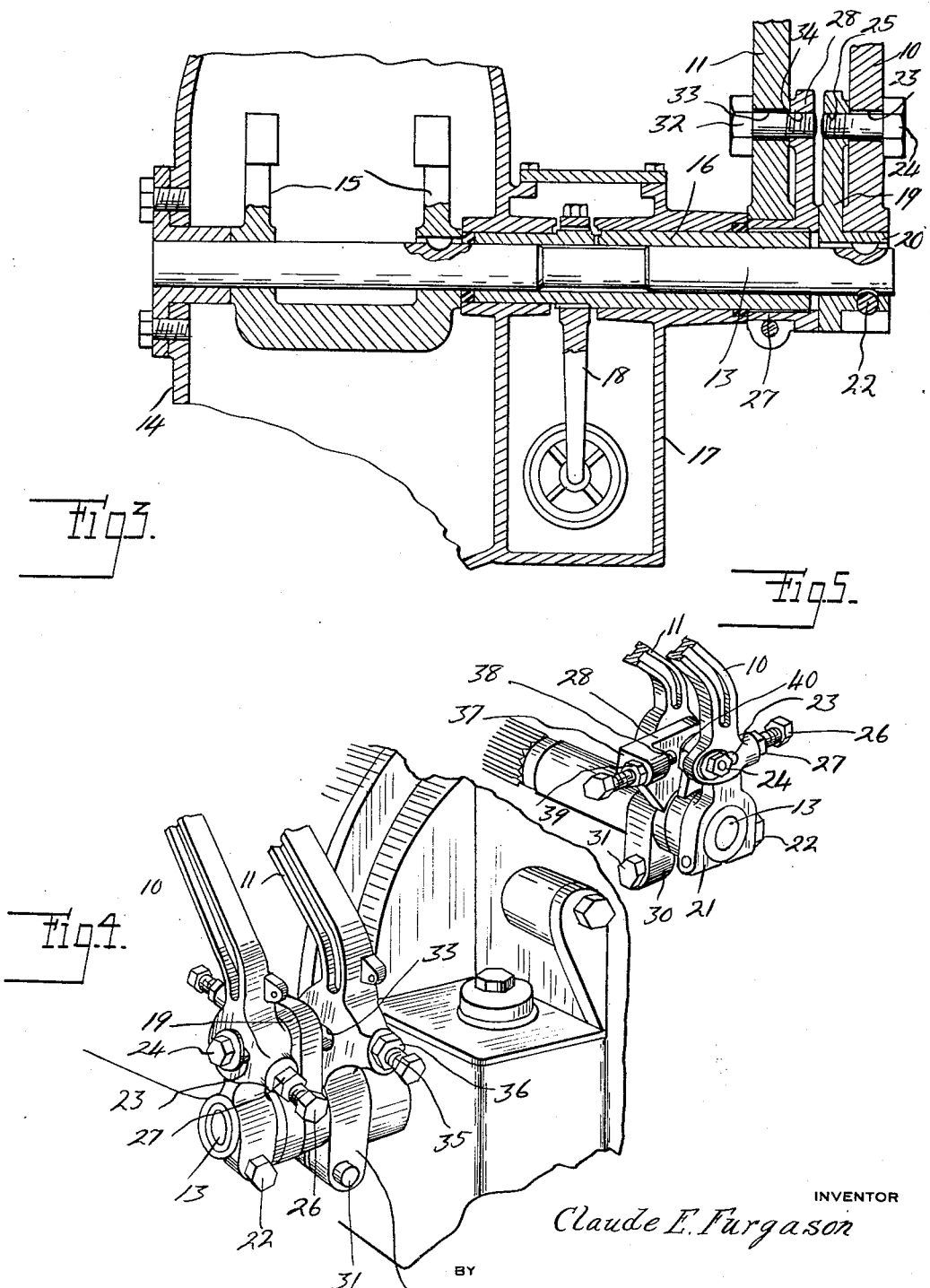

Patented Jan. 10, 1933

1,893,544

UNITED STATES PATENT OFFICE

CLAUDE E. FURGASON, OF LANSING, MICHIGAN, ASSIGNOR TO REO MOTOR CAR COMPANY, OF LANSING, MICHIGAN, A CORPORATION OF MICHIGAN

BRAKE AND CLUTCH LEVER

Application filed December 9, 1929. Serial No. 412,881.

This invention relates to brake and clutch lever constructions and more particularly to a certain novel improved construction thereof.

In brake and clutch lever constructions as now quite generally employed in connection with motor vehicles and the like, it is customary to provide individually operable levers, one for actuating the brake, and one for actuating the clutch of the motor vehicle. If the vehicle is brought to rest on an upgrade, difficulty is experienced, with the usual standard types of construction, in preventing the vehicle from moving backwardly when the foot is removed from the brake pedal to the foot throttle prior to the time that the clutch pedal is actuated to throw in the clutch. Moreover, it frequently occurs that it would be convenient, advantageous, and otherwise expedient to be able to lightly apply the brake immediately following the disengagement of the clutch without necessitating the removal of the right foot of the operator from the foot throttle to the brake pedal.

It is, therefore, one of the primary objects of this invention to provide a combined clutch and brake pedal construction wherein both of these levers may be actuated independently of one another to substantially the same extent as in present standard constructions but wherein it is possible to accomplish a light application of the brake through the medium of the clutch pedal and after the disengagement of the clutch.

Other objects, advantages and novel details of construction of the invention will be made more apparent as this description proceeds, especially when considered in connection with the accompanying drawings, wherein Figure 1 is a side elevational view of a clutch and brake pedal structure constructed in accordance with this invention;

Figure 2 is a fragmentary horizontal sectional view taken substantially on the plane indicated by line 2—2 in Figure 1;

Figure 3 is a vertical sectional view taken substantially on the plane indicated by line 3—3 in Figure 1;

Figure 4 is a fragmentary perspective view of the lower ends of the brake and clutch levers as seen from the driver's side of these levers, and Figure 5 is a substantially similar view as seen from the reverse side.

Referring now particularly to the drawings wherein like reference characters indicate like parts, it will be noted that there is illustrated a pair of levers 10 and 11 which, in the illustrated embodiment shown, constitute the clutch and brake levers respectively. The upper ends of these levers are provided with foot pedals 12 and the lower ends are connected, in a manner to be more fully hereinafter pointed out, to the clutch and brake actuating shafts. By reference to Figure 3 it will be noted that the reference character 13 indicates the clutch actuating shaft which extends into the housing 14 and carries yoke 15 constituting part of the clutch actuating mechanism. This latter being a substantially standard construction, the same is not fully shown or described in detail.

Surrounding the clutch shaft 13 is a sleeve 16 constituting the brake actuating shaft, this sleeve extending into the master cylinder reservoir 17 and having an arm 18 fixed thereto for actuating the master cylinder of a substantially standard form of hydraulic brake mechanism.

Fixed to the clutch shaft 13 is an arm 19. This arm is provided with a lateral sleeve-like extension 20 about which the split lower end 21 of the clutch lever 10 is clamped by means of a clamping bolt 22. The clutch lever 10 is provided with an elongated slot 23 through which a clamping bolt 24 passes, this bolt being threaded into a threaded aperture 25 in the upper end of arm 19. It is understood that arm 19 is fixed to the clutch actuating shafts 13 but the lever 10 may be rotatably adjusted with respect to this shaft and secured in its position by means of a clamping bolt 24. To further lock the parts in this position, I provide a locking bolt 26 which extends into the lever 10 at right angles to the bolt 24 and engages this bolt to lock the parts in position. A lock-nut 27 cooperates with the bolt 26.

Rigidly fixed to the brake shaft 16 is an arm 28, this arm being provided with a lateral sleeve-like extension 29 about which the split lower end 30 of the brake lever 11 is clamped by means of a clamping bolt 31. The brake lever 11 is rotatably adjustable with respect to the brake shaft 16 and may be held in this adjusted position by means of a clamping bolt 32 which extends through a slot 33 in the brake lever and into a threaded recess 34 in the upper end of arm 28. An additional locking bolt 35 provided with a lock-nut 36 is employed similar to the bolt 26 and lock-nut 27 previously referred to.

Obviously while either of the levers 10 or 11 may be rotatably adjusted with respect to their shafts 13 and 16, these levers when fixed to the arms 19 and 28 provide means for actuating their respective shafts upon operation of the levers.

The arm 28 is provided with an extension 37 in which an adjustable abutment in the form of a screw 38, is arranged. This adjusting screw may be locked in any adjusted position by means of a lock-nut 39. The end of the adjustable abutment 38 is in the path of movement of the upper end 40 of lever 19, but a space is provided therebetween so that the clutch pedal 10 may partake of a part of its clutch disengaging movement before the upper end 40 of arm 19 comes into engagement with the abutment 38. This movement is sufficient to cause a disengagement of the clutch and any continued movement of the lever 10 in the clutch disengaging direction brings the parts 40 and 38 into engagement so that the continued movement of lever 10 causes a movement of brake lever 11 in a brake applying direction. Obviously, if it is desired to effect a further application of the brakes, this may be accomplished by an independent actuation of the brake lever 11 either after it has been partially moved by reason of the above described actuation of the clutch pedal, or without any actuation of the clutch pedal.

With the herein described construction it is evident that upon a sufficient depression of the clutch pedal 10 the clutch will be first disengaged and subsequently the brake shaft will be actuated to cause a light application of the brakes. This will permit the vehicle to be held against rearward movement when it comes to rest on upgrades, or will permit the light application of the brakes without removing the right foot from the foot throttle. It will be obvious that the herein described construction does not in any manner whatsoever interfere with or effect the normal use of the brake pedal 11, as this brake pedal may be actuated as is customary and moreover, as will be necessary when a full application of the brakes is required.

The adjustability of the abutment 38 offers the possibility of effecting a movement of the brake lever at a predetermined time in the operation of the clutch lever.

While the invention has been illustrated and described as employed in connection with a hydraulic system of brake actuation, the invention may be applied with equal facility to any other type of brake control.

Reservation is made, therefor, to make such changes, modifications, and re-arrangements as may come within the purview of the accompanying claims.

What I claim as my invention is:

1. The combination with independently operable clutch and brake levers, of an arm adjustably associated with each lever, an abutment carried by the arm associated with said brake lever and arranged in the path of the arm associated with said clutch lever, said abutment being normally spaced from the arm associated with said clutch lever and adapted to be engaged therewith during the latter portion of the movement of said clutch lever in its clutch releasing movement.

2. In a structure of the class described, clutch and brake actuating shafts, clutch and brake levers, arms fixed to said clutch and brake actuating shafts, said arms being adjustably connected respectively to said clutch and brake levers, an abutment on one of said arms adapted to be engaged by an abutment carried by the other of said arms, said abutments being normally spaced from one another to permit an operative movement of the clutch lever relative to the brake lever whereby upon engagement of said abutments the brake lever is moved to apply the brake during the latter part of the movement of said clutch lever in its clutch releasing movement.

3. In a structure of the class described, clutch and brake actuating shafts, clutch and brake levers, arms fixed to said clutch and brake actuating shafts, means adjustably connecting said arms respectively to said clutch and brake levers, an abutment on one of said arms adapted to be engaged by an abutment carried by the other of said arms, said abutments being normally spaced from one another to permit a predetermined movement of the clutch lever relative to the brake lever whereby upon engagement of said abutments the brake lever is moved to apply the brake during the latter part of the movement of said clutch lever in its clutch releasing movement.

4. In a clutch and brake assembly of the class described, clutch and brake actuating shafts, clutch and brake levers, arms secured to said clutch and brake actuating shafts provided with sleeve-like projections, said clutch and brake levers being mounted on said sleeve-like projections and adjustably connected to said arms, and abutments carried by said arms normally spaced from one another to permit a predetermined movement of the clutch lever relative to the brake lever.

5. In a clutch and brake assembly of the class described, clutch and brake actuating shafts, clutch and brake levers, arms carried by said clutch and brake actuating shafts, means adjustably connecting said arms respectively to said clutch and brake levers and means cooperating with the first mentioned means to lock the said levers to their respective arms, and abtuments on said arms normally spaced from one another and adapted to be engaged upon movement of the clutch lever in its clutch releasing movement to apply the brake.

6. In a clutch and brake assembly of the class described, clutch and brake actuating shafts, arms secured to said shafts provided with sleeve-like projections, clutch and brake levers mounted on said sleeve-like projections and secured to said arms on their respective shafts, and abutments carried by said arms normally spaced from one another to permit a predetermined movement of the clutch lever relative to the brake lever, one of said abutments being adjustable, for the purpose described.

7. In a clutch and brake assembly of the class described, clutch and brake actuating shafts, clutch and brake levers mounted upon said clutch and brake actuating shafts respectively, means for adjusting said levers on said shafts, and abutments carried by said levers normally spaced from one another to permit an operative movement of the clutch lever relative to the brake lever and adapted to be engaged during the latter portion of the movement of the clutch lever in its clutch releasing movement to apply the brake.

In testimony whereof I affix my signature.

CLAUDE E. FURGASON.